United States Patent
Kobayashi et al.

(10) Patent No.: US 7,776,774 B2
(45) Date of Patent: Aug. 17, 2010

(54) COMPOSITE MATERIAL AND METHOD OF PRODUCING THE SAME

(75) Inventors: Yoshimasa Kobayashi, Nagoya (JP); Yuji Katsuda, Tsushima (JP)

(73) Assignee: NGK Insulators, Ltd., Nagoya (JP)

( * ) Notice: Subject to any disclaimer, the term of this patent is extended or adjusted under 35 U.S.C. 154(b) by 255 days.

(21) Appl. No.: 12/050,213

(22) Filed: Mar. 18, 2008

(65) Prior Publication Data

US 2008/0237543 A1  Oct. 2, 2008

(30) Foreign Application Priority Data

Mar. 27, 2007  (JP) .............................. 2007-080693

(51) Int. Cl.
*C04B 35/505* (2006.01)
*C04B 35/488* (2006.01)

(52) U.S. Cl. ...................... 501/103; 501/152

(58) Field of Classification Search .............. 501/103, 501/152
See application file for complete search history.

(56) References Cited

U.S. PATENT DOCUMENTS

2008/0264564 A1 * 10/2008 Sun et al. ................. 156/345.1
2009/0036292 A1 *  2/2009 Sun et al. ................... 501/134

FOREIGN PATENT DOCUMENTS

JP  2001-181042 A1  7/2001

* cited by examiner

*Primary Examiner*—Karl E Group
(74) *Attorney, Agent, or Firm*—Burr & Brown

(57) ABSTRACT

There is provided a strengthened composite material that is able to improve yield, handling, and reliability when it is applied to members of semiconductor manufacturing apparatus. Five to 60 mol % $ZrO_2$ is contained relative to $Y_2O_3$, and temperature after a sintering process is maintained between 1,200° C. to 1,500° C. for 5 minutes or longer or temperature falling speed to reach 1,200° C. is adjusted to 200° C./h or slower, thereby producing the composite material containing, as major crystalline phases, a $Y_2O_3$ solid solution in which $ZrO_2$ is dissolved in $Y_2O_3$ and a $ZrO_2$ solid solution in which $Y_2O_3$ is dissolved in $ZrO_2$.

8 Claims, 2 Drawing Sheets

FIG. 3

| | PREPARED COMPOSITION (mol %) | | SINTERING CONDITIONS | CONDITIONS MAINTAINED AT TEMPERATURE FALLING TIME | STRENGTH (MPa) | FRACTURE TOUGHNESS (MPa√m) | ETCHING RATE (nm/h) | PRESENCE OF ZrO$_2$ IN Y$_2$O$_3$ GRAINS |
|---|---|---|---|---|---|---|---|---|
| | Y$_2$O$_3$ | ZrO$_2$ | | | | | | |
| EMBODIMENT EXAMPLE 1 | 95 | 5 | 1600°C, 4h | | 220 | 1.1 | – | NONE |
| EMBODIMENT EXAMPLE 2 | 90 | 10 | 1600°C, 4h | | 230 | 1.2 | – | NONE |
| EMBODIMENT EXAMPLE 3 | 80 | 20 | 1600°C, 4h | | 243 | 1.3 | – | NONE |
| EMBODIMENT EXAMPLE 4 | 70 | 30 | 1600°C, 4h | | 233 | 1.3 | – | NONE |
| EMBODIMENT EXAMPLE 5 | 60 | 40 | 1600°C, 4h | | 248 | – | – | NONE |
| EMBODIMENT EXAMPLE 6 | 50 | 50 | 1600°C, 4h | | 237 | 1.2 | – | NONE |
| EMBODIMENT EXAMPLE 7 | 40 | 60 | 1600°C, 4h | | 234 | 1.1 | – | NONE |
| EMBODIMENT EXAMPLE 8 | 95 | 5 | 1600°C, 4h | 1400°C, 4h | 254 | 1.3 | – | EXIST |
| EMBODIMENT EXAMPLE 9 | 90 | 10 | 1600°C, 4h | 1400°C, 4h | 261 | 1.3 | – | EXIST |
| EMBODIMENT EXAMPLE 10 | 80 | 20 | 1600°C, 4h | 1500°C, 4h | 264 | – | – | EXIST |
| EMBODIMENT EXAMPLE 11 | 80 | 20 | 1600°C, 4h | 1400°C, 4h | 272 | 1.5 | 266 | EXIST |
| EMBODIMENT EXAMPLE 12 | 70 | 30 | 1600°C, 4h | 1500°C, 4h | 260 | – | – | EXIST |
| EMBODIMENT EXAMPLE 13 | 70 | 30 | 1600°C, 4h | 1400°C, 4h | 258 | 1.5 | 288 | EXIST |
| EMBODIMENT EXAMPLE 14 | 60 | 40 | 1600°C, 4h | 1500°C, 4h | 285 | – | – | EXIST |
| EMBODIMENT EXAMPLE 15 | 60 | 40 | 1600°C, 4h | 1400°C, 4h | 310 | 1.4 | 315 | EXIST |
| EMBODIMENT EXAMPLE 16 | 50 | 50 | 1600°C, 4h | 1500°C, 4h | 268 | – | – | EXIST |
| EMBODIMENT EXAMPLE 17 | 50 | 50 | 1600°C, 4h | 1400°C, 4h | 300 | 1.3 | 319 | EXIST |
| EMBODIMENT EXAMPLE 18 | 50 | 50 | 1600°C, 4h | 1300°C, 4h | 263 | – | – | EXIST |
| EMBODIMENT EXAMPLE 19 | 40 | 60 | 1600°C, 4h | 1500°C, 4h | 251 | – | – | EXIST |
| EMBODIMENT EXAMPLE 20 | 40 | 60 | 1600°C, 4h | 1400°C, 4h | 284 | 1.3 | 326 | EXIST |
| EMBODIMENT EXAMPLE 21 | 40 | 60 | 1600°C, 4h | 1300°C, 4h | 259 | – | – | EXIST |
| COMPARATIVE EXAMPLE 1 | 100 | 0 | 1600°C, 4h | | 220 | 1.0 | 243 | NONE |
| COMPARATIVE EXAMPLE 2 | 99 | 1 | 1600°C, 4h | | 227 | 1.1 | – | NONE |
| COMPARATIVE EXAMPLE 3 | 99 | 1 | 1600°C, 4h | 1400°C, 4h | 217 | 1.1 | – | NONE |
| COMPARATIVE EXAMPLE 4 | 30 | 70 | 1600°C, 4h | | 174 | 1.1 | – | NONE |
| COMPARATIVE EXAMPLE 5 | 30 | 70 | 1600°C, 4h | 1500°C, 4h | 224 | – | – | NONE |
| COMPARATIVE EXAMPLE 6 | 30 | 70 | 1600°C, 4h | 1400°C, 4h | 236 | 1.1 | 333 | NONE |
| COMPARATIVE EXAMPLE 7 | 30 | 70 | 1600°C, 4h | 1300°C, 4h | 238 | – | – | NONE |

COMPOSITE MATERIAL AND METHOD OF PRODUCING THE SAME

CROSS REFERENCE TO RELATED APPLICATION

This application is based upon and claims the benefit of priority from a Japanese Patent Application No. TOKUGAN 2007-80693, filed on Mar. 27, 2007; the entire contents of which are incorporated herein by reference.

BACKGROUND OF THE INVENTION

1. Field of the Invention

The present invention relates to a composite material suitable for use for members of semiconductor manufacturing apparatus, and a method of producing the composite material.

2. Description of the Related Art

In general, members of semiconductor manufacturing apparatus, such as a bell jar, chamber, susceptor, clamp ring, and focus ring, are used often in chemically corrosive atmospheres including a halogen-based gas atmosphere and a high-density plasma atmosphere. Against this background, an yttrium oxide-containing material, which has high corrosion resistance and is less liable to be a contaminant source, has been considered for use in forming the members of semiconductor manufacturing apparatus, as disclosed in Japanese Patent Laid-Open No. 2001-181042.

A conventional yttrium oxide-containing material is, however, inferior in mechanical characteristics because the three-point bending strength thereof is about 140 to 180 MPa and the fracture toughness is about 0.8 to 1.1 MPa·m$^{1/2}$. Therefore, when the conventional yttrium oxide-containing material is applied to the members of semiconductor manufacturing apparatus, those members can be broken when machined or used, which is disadvantageous in terms of yield, handing, and reliability.

The present invention has been made to solve the aforementioned problem, and an object thereof is to provide a composite material with excellent mechanical characteristics.

SUMMARY OF THE INVENTION

The inventors of the present invention have found as a result of their elaborate studies that the yttrium oxide-containing material becomes strong by containing, as main crystalline phases, an yttrium-oxide solid solution in which zirconium oxide ($ZrO_2$) is dissolved in yttrium oxide ($Y_2O_3$) and a zirconium-oxide solid solution in which the yttrium oxide is dissolved in the zirconium oxide, and also that the yield, handling, and reliability can accordingly be improved when this strengthened yttrium oxide-containing material is applied to the members of semiconductor manufacturing apparatus.

In the composite material according to the present invention, the proportion of a zirconium oxide content to an yttrium oxide content is desirably between 5 to 60 mol %. In general, the yttrium oxide is more corrosion-resistant to halogen-based plasma than the zirconium oxide. Therefore, the corrosion resistance required for use as the members of semiconductor manufacturing apparatus can be maintained more sufficiently as the proportion of the yttrium oxide content to the zirconium oxide content is increased. In contrast, the zirconium oxide is superior to the yttrium oxide in fracture toughness. Therefore, better fracture toughness is obtained as the proportion of the zirconium oxide content to the yttrium oxide content is increased. Moreover, the formation of a composite structure is likely to further improve mechanical characteristics. From these viewpoints, it is preferable that the proportion of the zirconium oxide content to the yttrium oxide content be from 5 to 60 mol %.

Furthermore, according to the present invention, the average size of crystal grains of the yttrium-oxide solid solution is desirably smaller than that of the zirconium-oxide solid solution. It is generally known that there is a correlation between the strength of ceramics and crystal grain size, in which defect size becomes smaller and the strength increases accordingly as the crystal grain size is made smaller. Moreover, sensitivity to defect sizes is different depending on materials even when the defect sizes are the same. As compared to the zirconium-oxide solid solution having superior mechanical characteristics, the yttrium-oxide solid solution having inferior mechanical characteristics is more sensitive. Therefore, the composite material strength can be increased efficiently when the crystal grain size of the yttrium-oxide solid solution with inferior mechanical characteristics is smaller than that of the zirconium-oxide solid solution.

Furthermore, according to the present invention, it is desirable that crystal grains 1 μm or less in grain size of the zirconium-oxide solid solution be dispersed in some crystal grains of the yttrium-oxide solid solution. In general, by dispersing fine particles of different material in material crystal grains, the strength can be enhanced. Dispersion of the fine crystal grains 1 μm or less in grain size of the zirconium-oxide solid solution in some crystal grains of the yttrium-oxide solid solution with inferior mechanical characteristics can increase the strength of the crystal grains of the yttrium-oxide solid solution, and accordingly efficiently enhance the strength of the composite material.

Moreover, according to the present invention, it is desirable to carry out a sintering process and an annealing process, the sintering process in which mixed powder of the yttrium oxide and the zirconium oxide is sintered at temperature between 1,400° C. and 1,850° C., and the annealing process in which the temperature falling after the sintering process is maintained between 1,200° C. and 1,500° C. for 5 minutes or longer, or the temperature falling speed to reach 1,200° C. is adjusted to 200° C./h or slower. At temperatures below 1,400° C., a highly densified sintered-body cannot be made, so that a material with sufficient mechanical characteristics cannot be obtained. At temperatures over 1,850° C., the crystal grain sizes of the yttrium-oxide and zirconium-oxide solid solutions become large, so that a material with sufficient mechanical characteristics cannot be obtained. Furthermore, by this annealing process in which the temperature falling after the sintering process is maintained between 1,200° C. and 1,500° C. for 5 minutes or longer or the temperature falling speed to reach 1,200° C. is adjusted to 200° C./h or slower, the fine crystal grains 1 μm or less in grain size of the zirconium-oxide solid solution are separated in the crystal grains of the yttrium-oxide solid solution, which leads to further improved mechanical characteristics.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 3 shows a measurement result of three-point bending test.

DETAILED DESCRIPTION OF THE PREFERRED EMBODIMENTS

Figure 1:
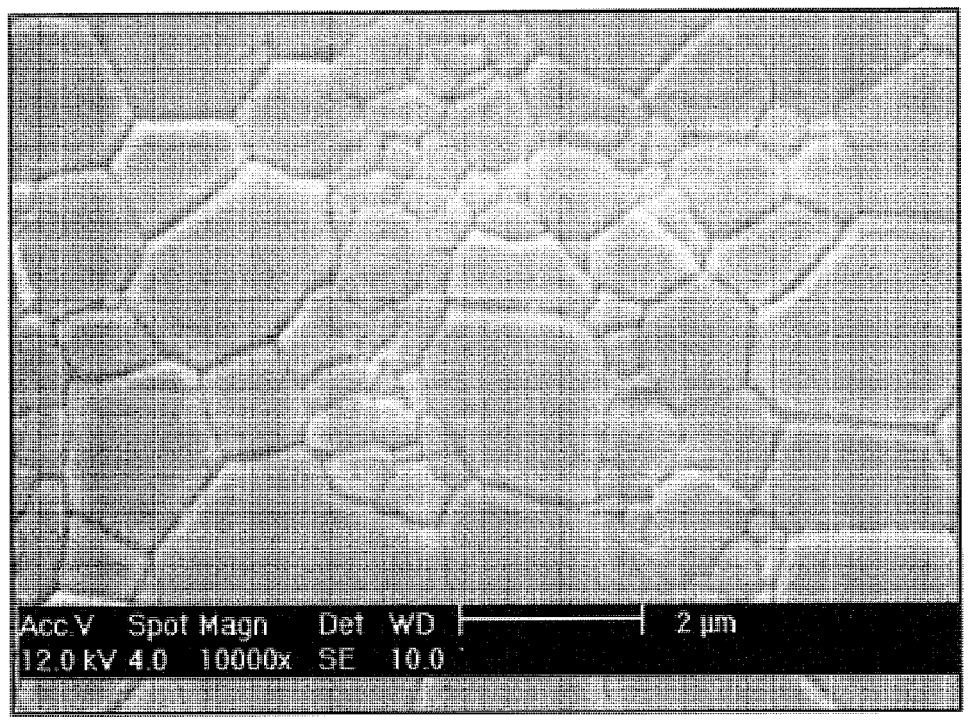
FIG. 1 is an SEM photograph of a composite material surface in embodiment examples.
Figure 2:
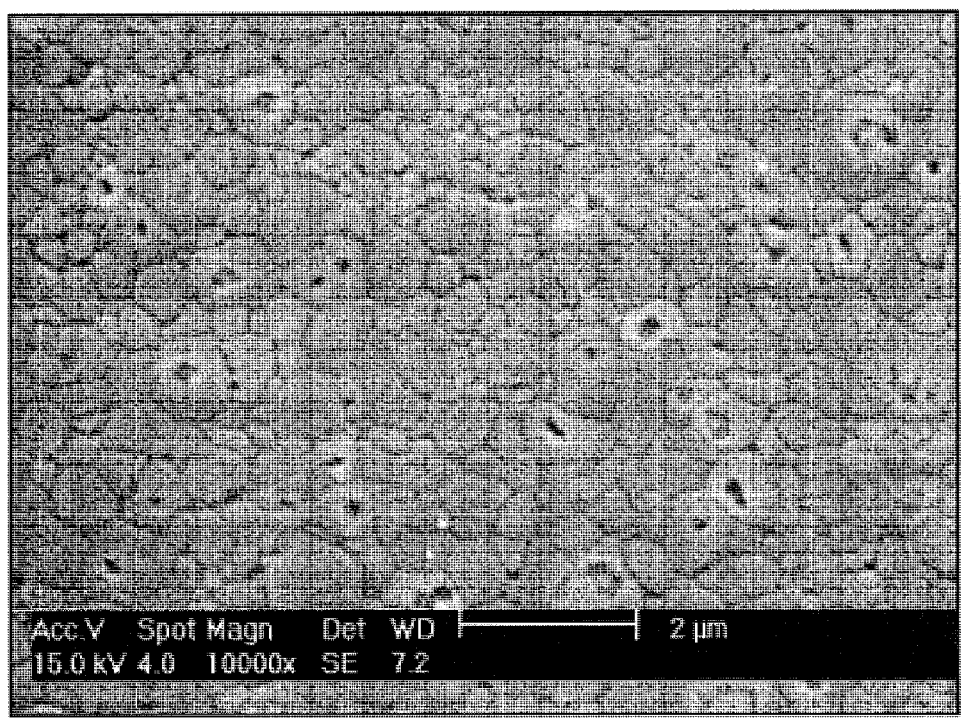
FIG. 2 is another SEM photograph of the composite material surface in the embodiment examples.

A composite material according to an embodiment of the present invention will be described in detail below by comparison of composite material strength, fracture toughness, and etching rate between embodiment examples and comparative examples.

First Embodiment Example

In a first embodiment example, 95 mol % yttrium oxide ($Y_2O_3$) and 5 mol % zirconium oxide ($ZrO_2$) were mixed together, and thereafter the resultant mixed powder was sintered at a sintering temperature of 1,600° C. for 4 hours, thereby obtaining a composite material of the first embodiment example.

Second Embodiment Example

In a second embodiment example, the same process as in the first embodiment example was performed, but the proportions of $Y_2O_3$ and $ZrO_2$ were 90 mol % and 10 mol %, respectively, thereby obtaining a composite material of the second embodiment example.

Third Embodiment Example

In a third embodiment example, the same process as in the first embodiment example was performed, but the proportions of $Y_2O_3$ and $ZrO_2$ were 80 mol % and 20 mol %, respectively, thereby obtaining a composite material of the third embodiment example.

Fourth Embodiment Example

In a fourth embodiment example, the same process as in the first embodiment example was performed, but the proportions of $Y_2O_3$ and $ZrO_2$ were 70 mol % and 30 mol %, respectively, thereby obtaining a composite material of the fourth embodiment example.

Fifth Embodiment Example

In a fifth embodiment example, the same process as in the first embodiment example was performed, but the proportions of $Y_2O_3$ and $ZrO_2$ were 60 mol % and 40 mol %, respectively, thereby obtaining a composite material of the fifth embodiment example.

Sixth Embodiment Example

In a sixth embodiment example, the same process as in the first embodiment example was performed, but the proportions of $Y_2O_3$ and $ZrO_2$ were the same, thereby obtaining a composite material of the sixth embodiment example.

Seventh Embodiment Example

In a seventh embodiment example, the same process as in the first embodiment example was performed, but the proportions of $Y_2O_3$ and $ZrO_2$ were 40 mol % and 60 mol %, respectively, thereby obtaining a composite material of the seventh embodiment example.

Eight Embodiment Example

In an eight embodiment example, the same process as in the first embodiment example was performed, but the temperature falling after the sintering process was maintained at 1,400° C. for 4 hours, thereby obtaining a composite material of the eight embodiment example.

Ninth Embodiment Example

In a ninth embodiment example, the same process as in the second embodiment example was performed, but the temperature falling after the sintering process was maintained at 1,400° C. for 4 hours, thereby obtaining a composite material of the ninth embodiment example.

Tenth Embodiment Example

In a tenth embodiment example, the same process as in the third embodiment example was performed, but the temperature falling after the sintering process was maintained at 1,500° C. for 4 hours, thereby obtaining a composite material of the tenth embodiment example.

Eleventh Embodiment Example

In an eleventh embodiment example, the same process as in the third embodiment example was performed, but the temperature falling after the sintering process was maintained at 1,400° C. for 4 hours, thereby obtaining a composite material of the eleventh embodiment example.

Twelfth Embodiment Example

In a twelfth embodiment example, the same process as in the fourth embodiment example was performed, but the temperature falling after the sintering process was maintained at 1,500° C. for 4 hours, thereby obtaining a composite material of the twelfth embodiment example.

Thirteenth Embodiment Example

In a thirteen embodiment example, the same process as in the fourth embodiment example was performed, but the temperature falling after the sintering process was maintained at 1,400° C. for 4 hours, thereby obtaining a composite material of the thirteenth embodiment example.

Fourteenth Embodiment Example

In a fourteenth embodiment example, the same process as in the fifth embodiment example was performed, but the temperature falling after the sintering process was maintained at 1,500° C. for 4 hours, thereby obtaining a composite material of the fourteenth embodiment example.

Fifteenth Embodiment Example

In a fifteenth embodiment example, the same process as in the fifth embodiment example was performed, but the temperature falling after the sintering process was maintained at 1,400° C. for 4 hours, thereby obtaining a composite material of the fifteenth embodiment example.

Sixteenth Embodiment Example

In a sixteenth embodiment example, the same process as in the sixth embodiment example was performed, but the temperature falling after the sintering process was maintained at 1,500° C. for 4 hours, thereby obtaining a composite material of the sixteenth embodiment example.

Seventeenth Embodiment Example

In a seventeenth embodiment example, the same process as in the sixth embodiment example was performed, but the temperature falling after the sintering process was maintained at 1,400° C. for 4 hours, thereby obtaining a composite material of the seventeenth embodiment example.

Eighteenth Embodiment Example

In an eighteenth embodiment example, the same process as in the sixth embodiment example was performed, but the temperature falling after the sintering process was maintained at 1,300° C. for 4 hours, thereby obtaining a composite material of the eighteenth embodiment example.

Nineteenth Embodiment Example

In a nineteenth embodiment example, the same process as in the seventh embodiment example was performed, but the temperature falling after the sintering process was maintained at 1,500° C. for 4 hours, thereby obtaining a composite material of the nineteenth embodiment example.

Twentieth Embodiment Example

In a twentieth embodiment example, the same process as in the seventh embodiment example was performed, but the temperature falling after the sintering process was maintained at 1,400° C. for 4 hours, thereby obtaining a composite material of the twentieth embodiment example.

Twenty-First Embodiment Example

In a twenty-first embodiment example, the same process as in the seventh embodiment example was performed, but the temperature falling after the sintering process was maintained at 1,300° C. for 4 hours, thereby obtaining a composite material of the twenty-first embodiment example.

FIRST COMPARATIVE EXAMPLE

In a first comparative example, $Y_2O_3$ powder was sintered at a sintering temperature of 1,600° C. for 4 hours, thereby obtaining a material of the first comparative example.

SECOND COMPARATIVE EXAMPLE

In a second comparative example, the same process as in the first embodiment example was performed, but the proportions of $Y_2O_3$ and $ZrO_2$ were 99 mol % and 1 mol %, respectively, thereby obtaining a composite material of the second comparative example.

THIRD COMPARATIVE EXAMPLE

In a third comparative example, the same process as in the second comparative example was performed, but the temperature falling after the sintering process was maintained at 1,400° C. for 4 hours, thereby obtaining a composite material of the third comparative example.

FOURTH COMPARATIVE EXAMPLE

In a fourth comparative example, the same process as in the first embodiment example was performed, but the proportions of $Y_2O_3$ and $ZrO_2$ were 30 mol % and 70 mol %, respectively, thereby obtaining a composite material of the fourth comparative example.

FIFTH COMPARATIVE EXAMPLE

In a fifth comparative example, the same process as in the fourth comparative example was performed, but the temperature falling after the sintering process was maintained at 1,500° C. for 4 hours, thereby obtaining a composite material of the fifth comparative example.

SIXTH COMPARATIVE EXAMPLE

In a sixth comparative example, the same process as in the fourth comparative example was performed, but the temperature falling after the sintering process was maintained at 1,400° C. for 4 hours, thereby obtaining a composite material of the sixth comparative example.

SEVENTH COMPARATIVE EXAMPLE

In a seventh comparative example, the same process as in the fourth comparative example was performed, but the temperature falling after the sintering process was maintained at 1,300° C. for 4 hours, thereby obtaining a composite material of the seventh comparative example.

[Identification of Crystalline Phase]

By using an x-ray diffractometer (rotating-target x-ray diffractometer (RINT of Rigaku Corporation), CuKα radiation, 50 kV, 300 mA, 2θ=10° to 70°), crystalline phases were identified based on x-ray diffraction patterns obtained from each material of the first to the twenty-first embodiment examples and of the first to the seventh comparative examples, and also the composition inside the crystal grains was analyzed by using SEM-EDX. As a result, each material of the first to the twenty-first embodiment examples, which had been annealed after sintered, was found to contain, as main crystalline phases, the $Y_2O_3$ solid solution containing $ZrO_2$ dissolved therein and the $ZrO_2$ solid solution containing $Y_2O_3$ dissolved therein.

Since $Y_2O_3$ and $ZrO_2$ have similar crystalline structures and hence their major peaks overlap each other, it is difficult to identify the crystalline phases of $Y_2O_3$ and $ZrO_2$ separately. Therefore, the peak derived only from $Y_2O_3$ that had appeared at 20.5° was used to confirm the presence of $Y_2O_3$, and also peak shifts were used to confirm the formation of solid solutions. As a result, in the first to the twenty-first embodiment examples and the first to the third comparative examples, the presence of $Y_2O_3$ was confirmed, and the peak corresponding to 20.5° shifted toward large angles, so that the formation of the $Y_2O_3$ solid solution containing $ZrO_2$ dissolved therein was inferred therefrom. The formation of the $ZrO_2$ solid solution was confirmed by using SEM-EDX. In the first to the twenty-first embodiment examples, the crystal grains containing more $Y_2O_3$ than $ZrO_2$ as well as the crystal grains containing more $ZrO_2$ than $Y_2O_3$ were present, so that the main crystalline phases were found to be the $Y_2O_3$ solid solution containing $ZrO_2$ dissolved therein and the $ZrO_2$ solid solution containing $Y_2O_3$ dissolved therein. In the first to the third comparative examples, the main phase was found to be the $Y_2O_3$ solid solution containing $ZrO_2$ dissolved therein, and in the fourth to the seventh comparative examples, the main phase was found to be the $ZrO_2$ solid solution containing $Y_2O_3$ dissolved therein.

Furthermore, the microstructure and composition of each material of the first to the twenty-first embodiment examples and of the first to the seventh comparative examples were evaluated by SEM observation and chemical analysis using EDX. As a result, each material of the eight to the twenty-first embodiment examples, which had been annealed at the temperature falling time after sintered, was found to have large average crystal grain size of the $ZrO_2$ solid solution compared to the average crystal grain size of the $Y_2O_3$ solid solution, as shown by an SEM photograph of FIG. 1. Moreover, each material of the eight to the twenty-first embodiment examples was found to have some crystal grains of the $Y_2O_3$ solid solution in which the crystal grains 1 μm or less in grain size of the $ZrO_2$ solid solution were dispersed.

[Evaluation of Strength]

For each material of the first to the twenty-first embodiment examples and of the first to the seventh comparative examples, three-point bending strength was measured by three-point bending test. The measurement result is shown in FIG. 3. As a result, the materials of the eight to the twenty-first embodiment examples, which had been annealed at the temperature falling time after sintered, had three-point strength of 250 MPa or higher.

[Evaluation of Fracture Toughness]

For each material of the first to the twenty-first embodiment examples and of the first to the seventh comparative examples, fracture toughness was measured according to IF method in conformity to JIS_R_1607. The measurement result is shown in FIG. 3. As a result, the materials of the eight to the twenty-first embodiment examples, which had been annealed after sintered, had fracture toughness of 1.3 $MPa \cdot m^{1/2}$ or higher.

[Evaluation of Etching Rate]

For each material of the first to the twenty-first embodiment examples and of the first to the seventh comparative examples, plasma-resistance test was performed using a corrosion resistance tester. Specifically, plasma was generated using gas containing $NF_3$, $O_2$, or Ar at 800 W of ICP power, and the generated plasma was irradiated to a test piece at 300 W bias power. Subsequently, an etching rate of each material was calculated by dividing a difference in level between a masked surface and an exposed surface by test duration. The calculation result is shown in FIG. 3. As the proportion of the $ZrO_2$ content to the $Y_2O_3$ content was increasing, the etching rate also monotonously increased, and accordingly the corrosion resistance to plasma showed a tendency to decrease. However, in comparison between the first comparative example in which the $Y_2O_3$ content is 100 mol % and the twentieth embodiment example in which the $Y_2O_3$ content and the $ZrO_2$ content were 40 mol % and 60 mol %, respectively, the etching rate increased about 30%.

From the foregoing results, by containing 5 to 60 mol % $ZrO_2$ relative to $Y_2O_3$ content, and also by maintaining the temperature after the sintering process between 1,200° C. and 1,500° C. for 5 minutes or adjusting the temperature falling speed to reach 1,200° C. to 200° C./h or slower, a strengthened composite material can be prepared which is able to improve yield, handling, and reliability when it is applied to the members of semiconductor manufacturing apparatus.

What is claimed is:

1. A composite material used for members of semiconductor manufacturing apparatus, comprising: major crystalline phases of an yttrium-oxide ($Y_2O_3$) solid solution in which zirconium oxide ($ZrO_2$) is dissolved in yttrium oxide and a zirconium-oxide solid solution in which the yttrium oxide is dissolved in the zirconium oxide.

2. The composite material according to claim 1, wherein a proportion of a zirconium oxide content to an yttrium oxide content is between 5 to 60 mol %.

3. The composite material according to claim 1, wherein an average crystal grain size of the zirconium-oxide solid solution is larger than that of the yttrium-oxide solid solution.

4. The composite material according to claim 1, wherein crystal grains 1 μm or less in grain size of the zirconium-oxide solid solution are dispersed in some crystal grains of the yttrium-oxide solid solution.

5. The composite material according to claim 1, wherein three-point bending strength is 250 MPa or above.

6. The composite material according to claim 1, wherein fracture toughness is 1.3 $MPa \cdot m^{1/2}$ or above.

7. The composite material according to claim 1, wherein porosity is 5% or below.

8. A method of producing the composite material according to claim 1, comprising: a sintering step of sintering mixed powder of the yttrium oxide and the zirconium oxide at a sintering temperature of 1,400° C. to 1,850° C.; and an annealing step of maintaining temperature falling after the sintering step between 1,200° C. and 1,500° C. for 5 minutes or adjusting a temperature falling speed to reach 1,200° C. to 200° C./h or slower.

* * * * *